United States Patent
Walker et al.

Patent Number: 6,160,587
Date of Patent: Dec. 12, 2000

[54] WAVEFORM GENERATOR FOR INSERTION OF DATA INTO DIGITAL TELEVISION SIGNALS

[75] Inventors: G. Kent Walker, Escondido; Ray Nuber, La Jolla, both of Calif.

[73] Assignees: Motorola, Inc., Schaumburg, Ill.; General Instrument Corporation, Horsham, Pa.

[21] Appl. No.: 08/887,046

[22] Filed: Jul. 2, 1997

Related U.S. Application Data

[60] Provisional application No. 60/035,395, Jan. 16, 1997.

[51] Int. Cl.[7] .............................. H04N 7/00; H04N 11/00; H04N 7/04
[52] U.S. Cl. ........................ 348/478; 348/468; 348/461; 348/473
[58] Field of Search .................................... 348/468, 473, 348/474, 476, 477, 478, 467, 465, 461; H04N 7/00, 11/00, 7/04

[56] References Cited

U.S. PATENT DOCUMENTS

| | | | |
|---|---|---|---|
| 4,611,227 | 9/1986 | Brockhurst et al. | 348/478 |
| 5,289,276 | 2/1994 | Siracusa et al. . | |
| 5,400,401 | 3/1995 | Wasilewski et al. . | |
| 5,493,339 | 2/1996 | Birch et al. | 348/467 |
| 5,519,780 | 5/1996 | Woo et al. . | |
| 5,526,427 | 6/1996 | Thomas et al. . | |
| 5,555,025 | 9/1996 | McArthur et al. | 348/478 |
| 5,566,089 | 10/1996 | Walker et al. . | |

FOREIGN PATENT DOCUMENTS

| | | |
|---|---|---|
| 0 740 474 | 10/1996 | European Pat. Off. . |
| WO 95 15660 | 6/1995 | WIPO . |
| WO 97 01930 | 1/1997 | WIPO . |
| WO 98 05167 | 2/1998 | WIPO . |

*Primary Examiner*—Nathan Flynn
*Assistant Examiner*—Vivek Srivastava
*Attorney, Agent, or Firm*—Barry R. Lipsitz

[57] ABSTRACT

A digital waveform generator complies with different vertical blanking interval (VBI) standards, and is inserted into VBI portions of a digital component video signal. A buffer receives symbols carrying VBI data for a particular VBI service according to a user data syntax, which identifies a television line into which the VBI data is to be inserted. A symbol processor is responsive to information provided by the syntax. This information indicates the number of pixels represented per symbol, a symbol transition time, and the number of symbols carrying data to be inserted into the VBI portion. The symbol processor provides the VBI data in a format according to the particular VBI service. A timing circuit is responsive to a start time provided by the syntax for inserting the VBI data. A level control circuit adjusts the level of the VBI data prior to insertion into the VBI portion in response amplitude values provided by the syntax.

22 Claims, 5 Drawing Sheets

WAVEFORM GENERATOR FOR INSERTION OF DATA INTO DIGITAL TELEVISION SIGNALS

This application claims the benefit of U.S. provisional application no. 60/035,395, filed on Jan. 16, 1997.

BACKGROUND OF THE INVENTION

The present invention relates to the communication of digital television signals, and more particularly to a waveform generator useful for providing a digital television signal with data of a type conventionally carried in the vertical blanking interval (VBI) of an analog television signal. Examples of such data, hereinafter referred to as "user data", include closed caption data (CC), vertical interval time code (VITC), non-realtime video data (e.g., vertical interval test signals—VITS), sampled video data, North American Basic Teletext Specification (NABTS), World System Teletext (WST), European Broadcast Union (EBU) data and Nielsen Automated Measurement of Lineup (AMOL) data.

Digital transmission of television signals can deliver video and audio services of much higher quality than analog techniques. Digital transmission schemes are particularly advantageous for signals that are broadcast via a cable television network or by satellite to cable television affiliates and/or directly to home satellite television receivers. It is expected that digital television transmitter and receiver systems will replace existing analog systems just as digital compact discs have replaced analog phonograph records in the audio industry.

One way to transmit the compressed video data to a receiver is in the form of packets contained within a packetized data stream. Typically, packets carrying compressed video data are multiplexed with other packets, e.g., carrying corresponding audio data and control information necessary to reconstruct a television signal. One standard for transporting digital television signals in this manner is the MPEG-2 standard, details of which can be found in the International Organisation for Standardisation, ISO/IEC 13818-1, International Standard, Nov. 13, 1994 entitled "Generic Coding of Moving Pictures and Associated Audio: Systems," recommendation H.222.0, incorporated herein by reference. Further details of the video syntax and semantics for MPEG-2 video can be found in International Organisation for Standardisation, ISO/IEC 13818-2, International Standard, 1995 entitled "Generic Coding of Moving Pictures and Associated Audio: Video," recommendation H.262, also incorporated herein by reference.

Another standard for transporting digital television data in a packet stream is the Advanced Television Systems Committee (ATSC) Digital Television Standard A/53, approved on Apr. 12 and Sep. 15, 1995, incorporated herein by reference. The ATSC Digital Television Standard is based on the ISO/IEC MPEG-2 Video Standard, the Digital Audio Compression (AC-3) Standard, and the ISO/IEC MPEG-2 Systems Standard.

In the ATSC and MPEG-2 systems (and the similar DigiCipher® II system proprietary to General Instrument Corporation, the assignee hereof) a transport stream, or transport multiplex is made up of a contiguous set of fixed length packets. The video sequence is transported using a hierarchical structure in which a sequence header is followed by various extensions, user data, a group of pictures ("GOP") header, optional user data, a picture header, etc. The sequence header provides information for a sequence of pictures, which in general will include more than one GOP. This information includes, for example, horizontal and vertical size values, aspect ratio, frame and bit rate, and quantization parameters for the video data. A user data extension can also be included which, among other things, provides additional data for use by decoders. The DigiCipher® II standard provides for the transport of additional user data after the sequence header, in order to identify a DigiCipher® II signal and the use of any special video compression techniques used within a sequence, including DigiCipher® special prediction and block motion estimation.

In both the MPEG-2 and DigiCipher® II syntaxes, a sequence display extension containing, e.g., video format and color description information, is provided in addition to the sequence extension and user data. A subsequent group of pictures header provides, among other information, a time code. Thereafter, a picture header is provided which includes various information pertaining to a corresponding picture in a sequence of pictures to be displayed. A picture extension and, ultimately, the actual picture data to be decoded and reproduced for viewing, is then provided. It is noted that MPEG does not specify the order in which various extensions (such as the sequence display extension) or the user data must be transmitted beyond the fact that they must be after the sequence extension and before the GOP header (if provided) or the picture header. MPEG does not require GOP headers to be sent, and such headers may be bypassed in particular implementations.

In a practical transmission system it may be necessary to include additional data at different times for specific purposes, such as providing closed captioning, VITS, auxiliary real time video, Teletext, and AMOL data. Such additional data may be carried in the vertical blanking interval (VBI) portions of an analog television signal, and is referred to herein as "VBI user information", "user data", or "user information."

Many standards have been developed for services provided via waveforms carried in the VBI lines of analog and composite video. Digital video compression systems tend to employ algorithms optimized for the characteristics of two dimensional motion video. These algorithms are not generally well suited for the compression of video waveforms present in the VBI lines of analog video.

The character of VBI waveforms is very different compared to active video. Transmission without compression for these lines is very bandwidth intensive, such as sending 8 or 10 bit samples of 704 or 720 luminance and chrominance pixels. For example, 720 luminance and chrominance values at 8 bit resolution and 30 Hz requires 345,600 bps while the information conveyed by these lines only represents 480 bps for closed captions and 6720 bps for North American Basic Teletext Specification. As the transition to digital video proceeds, the demand for carriage and reconstruction of VBI services continues. Digital video distribution systems are expected to reconstruct the VBI as well as the active video, even when digital video compression techniques are employed. Thus, there is a need for algorithms, syntax and semantics specifically for the compression of VBI video lines that will allow an efficient and flexible alternative to developing VBI-waveform specific user data syntax and semantics.

It would be advantageous to provide a generic transport syntax and semantics for digital television data that would accommodate various types of VBI user information which may or may not be used at any given time. Such a scheme would enable the economical management of bandwidth while providing flexibility as to the transport of VBI user information.

It would be further advantageous to provide a waveform generator for providing digital waveforms that comply with the various VBI waveform standards, in response to the generic transport syntax. The present invention provides a generic waveform generator enjoying the aforementioned advantages.

SUMMARY OF THE INVENTION

In accordance with the present invention, apparatus is provided for generating digital waveforms complying with different vertical blanking interval (VBI) services for insertion into VBI portions of a digital component video signal. A buffer receives a plurality of symbols carrying VBI data for a particular VBI service according to a user data syntax, which identifies a television line into which the VBI data is to be inserted. A timing circuit is responsive to a start time (provided by the syntax) for a first one of the symbols to effect the insertion of the VBI data into the VBI portion of the digital component video signal at a time dictated by the particular VBI service. A symbol processor is responsive to information provided by the syntax. This information indicates (i) a number of pixels represented per symbol, (ii) a transition time for the symbols, and (iii) the number of symbols carrying data to be inserted into the VBI portion. The symbol processor provides the VBI data in a format dictated by the particular VBI service.

A level control circuit may be provided to adjust the level of the VBI data prior to insertion into the VBI portion in response to at least one amplitude value provided by the syntax. Multilevel amplitude modulation of the VBI data may optionally be provided.

In a first embodiment used for VBI data having a single symbol impulse response, the symbol processor comprises a transition processor for detecting a transition in the VBI data, and generating a transition waveform in response to the detected transition. The transition waveform complies with the format dictated by the particular VBI service. Means are provided for combining the transition waveform with the VBI data to provide the digital waveform for insertion into the VBI portion of the television line identified by the syntax.

The transition processor may further include a memory for storing transition data for generating the transition waveforms. The transition waveform may be a ramp or a non-linear function, for example.

In a second embodiment used for VBI data having a single and/or multisymbol impulse response, the symbol processor implements a finite impulse response (FIR) function (equivalent, e.g., to an FIR filter) for generating a data symbol sequence which represents the VBI data for the particular VBI service for insertion into the VBI portion of the television line identified by the syntax. A memory may also be provided for storing finite impulse response data for the VBI services according to a transition type of the VBI services which is defined by the syntax, where the means for implementing is responsive to the stored finite impulse response data for implementing the finite impulse response function for the particular VBI service. Alternatively, an infinite impulse response (IIR) filter or equalizer may be used. In any case, the filter may be implemented in a look-up table. The impulse response data may be downloaded to the memory in conjunction with the VBI service or independently. Moreover, the first and second embodiments may be realized in a single implementation.

A corresponding method is also presented.

DETAILED DESCRIPTION OF THE INVENTION

The present invention provides a bandwidth efficient method and apparatus for using a digital television data stream to transport variable amounts of different types of information conventionally carried in the VBI portion of an analog television signal. The information of concern is a subset of a type of user data referred to as "picture user data" to distinguish it from "sequence user data" in an MPEG, ATSC or DigiCipher® II transport stream. This subset, referred to herein as VBI user information, comprises information such as closed caption data, sampled video data, NABTS, WST, EBU data and Nielsen AMOL data. Each of these categories of picture user data is updated each picture. The picture user data is transported in portions of successive video frames which correspond to VBI lines. Each VBI line is represented by 720 eight-bit luminance samples and 720 eight-bit chrominance samples before processing in accordance with the present invention.

The present invention resulted from a realization that most of the standard VBI waveforms can be represented as pulse amplitude modulated (PAM) data (e.g., such as non-return-to-zero (NRZ) data) modulated onto the luminance portion of a video signal. Such waveforms can be classified by their pulse shape, number of pixels per symbol, symbol-to-risetime ratio, waveform start time within the video line, and applicable video system (i.e., video standard). Since none of the standards specify significant line-to-line or frame-to-frame correlation of data, each VBI line can be processed independently of any other VBI line.

Moreover, the pulse shape specifications allow the different VBI waveforms to be categorized into waveforms that require a pulse shape of less than one symbol time in duration (such as non-Teletext waveforms) and waveforms that require a pulse shape of more than one symbol time (such as Teletext waveforms).

The present invention capitalizes on the realizations set forth above with respect to the various different VBI waveform formats to provide a waveform generator which is compatible with various types of VBI data which is communicated in a digital television data stream. A single state machine is provided that is able to reconstruct most of the various VBI waveforms. The state machine allows the following parameters to be programmable: the field number of the particular VBI line, the line number of the particular VBI line, the symbol rate used by the particular VBI waveform standard, the standard's CCIR-601 start sample number, the standard's risetime (symbol to transition duration ratio), the standard's CCIR-601 value for NRZ "0" and "1" symbols, the number of symbols in the standard's waveform, and the vector of values of the symbols in the particular VBI line's waveform. As will be appreciated by those skilled in the art, "CCIR-601" is a standard promulgated by the International Radio Consultive Committee for digital component coding and filtering.

Table 1 summarizes the key attributes of the known VBI waveform standards. The phrase "VBI service" is used herein to refer to any of the listed standards as well as any other VBI data format, protocol or system. The standards listed apply to either 525-line (NTSC and PAL/M) or 625-line (PAL excepting PAL/M) video Systems. Each standard provides some portion of the waveform as a Timing Reference and Sync Pattern for the purpose of symbol synchronization. As well, each provides a fixed number of Data Bits per video line, some of which may be provided for the purpose of Error Detection. Each modulates the data bits onto the video line via some Modulation technique and employing different Amplitudes to represent different data bit values. Finally, each waveform employs a nominal Symbol Rate (sometimes referenced to the video line rate [fh]) and Pulse (symbol) Shape (often specified with a rise time [tr] or Raised Cosine pulse shape with a particular value of Alpha). The unique attributes of particular standards are highlighted in bold font.

waveforms which have a pulse shape of more than one symbol time for the Teletext waveforms.

3. None of the standards specify significant line-to-line or frame-to-frame correlation of data; thus, it is advantageous to handle each VBI line independently of any other VBI line.

4. VITC's synchronization bits are best simply handled as data bits.

5. The number of CCIR-601 samples per symbol ranges by a factor of 13 over all the waveforms.

6. The symbol-to-risetime ratio ranges from 1.5 to 8.5 over all the non-Teletext waveforms.

7. The symbol rate of the waveforms ranges by a factor of 21.

8. The required start sample of the waveforms, relative to the first CCIR-601 sample, ranges from 27 samples before CCIR-601 sample zero to 80 samples after sample zero with a nominal value of 26 samples after sample zero.

In view of the above conclusions, it has been determined that a single state machine can be created to reconstruct all of these VBI waveforms if the following parameters are programmable in the state machine:

1. The field number of the particular VBI line,
2. The line number of the particular VBI line,
3. The standard's symbol rate,
4. The standard's CCIR-601 start sample number,
5. The standard's risetime (symbol transition duration),
6. The standard's CCIR-601 value for NRZ "0" and "1" symbols,

TABLE 1

Summary of VBI Waveform Standards.

| Standard | System | Timing Reference | Sync Pattern | Data Bits | Modulation | Amplitude | Symbol Rate | Pulse Shape |
|---|---|---|---|---|---|---|---|---|
| CC | 525 | 7 sine cycles | 3 bits | 16 | NRZ | 0 & 70 IRE | 32 fh | tr = 240 nsec |
| AMOL I | 525 | sync bits | 7 bits | 41 | NRZ | 5 & 55 IRE | 1 Mbps | tr = 250 nsec |
| AMOL II | 525 | sync Bits | 8 bits | 88 | NRZ | 5 & 55 IRE | 2 Mbps | tr = 125 nsec |
| NABTS | 525 | sync bits | 16 bits | 272 | NRZ | 0 & 70 IRE | 364 fh | alpha = 1.0 |
| WST | 525 | sync bits | 24 bits | 272 | NRZ | 0 & 66 IRE | 364 fh | alpha = 0.45 |
| WST | 625 | sync bits | 24 bits | 336 | NRZ | 0 & 70 IRE | 444 fh | alpha = 0.45 |
| VITC | 525 | sync bits | 9 pairs of bits distributed | 72 | NRZ | 0 & 570 mV | 455/4 fh | tr = 200 nsec |
| VITC | 625 | sync bits | 9 pairs of bits distributed | 72 | NRZ | 0 & 550 mV | 116 fh | tr = 200 nsec |
| EBU 3217 | 625 | sync bits | 8 bits (16 symbols) | 120 bits (240 symbols) | Bi-Phase | 0 & 500 mV | 2.5 Mbps | tr = 250 nsec |

Various conclusions can be drawn by comparing the different VBI waveform standards set forth in Table 1. These include:

1. All of the waveforms can be represented as NRZ data modulated onto the luminance of the video signal, even EBU 3217's bi-phase modulated symbols, but the nominal luminance values representing NRZ "0" and "1" symbols differ from waveform to waveform.

2. The Pulse Shape specifications can be classified as waveforms which have a pulse shape of less than one symbol time in duration for the non-Teletext waveforms, and 7. The number of symbols in the standard's waveform, 8. The vector of values of the symbols in the particular VBI line's waveform.

A state machine providing programmability of the above parameters for use in reconstructing each of the various VBI waveforms is disclosed below in connection with FIG. 3. Prior to discussing the state machine, the novel syntax in accordance with the present invention is disclosed in conjunction with an example embodiment of an encoder and decoder structure.

Figure 1:
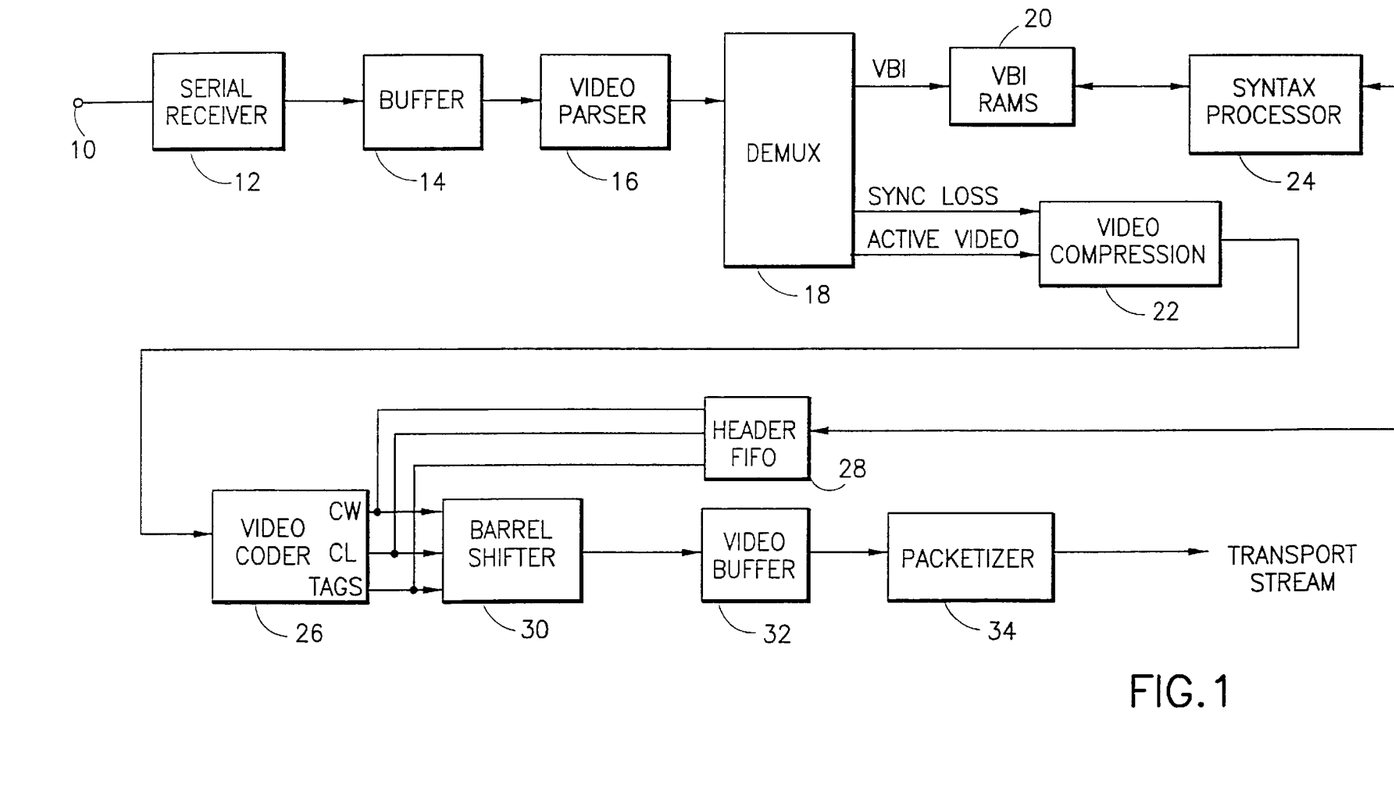
FIG. 1 is a block diagram of a digital video encoder that incorporates the present invention.

FIG. 1 illustrates, in block diagram form, an encoder for processing raw digital video data into a user data syntax in which variable amounts of different types of VBI user information can be communicated in a digital television data stream. The user data syntax may include PAM data, such as NRZ data, referred to herein as "luma NRZ". It will be appreciated that while NRZ data is referred to in particular illustrative examples, other PAM schemes may be used. The raw digital video, such as video complying with the Society of Motion Picture and Television Engineers (SMPTE) standard is input to a serial receiver 12 via terminal 10. The serial receiver serializes the data which is input in a parallel format. The serialized data is buffered in a buffer 14, which can comprise a conventional first-in first-out (FIFO) register. A video parser 16 interprets the syntax of the serialized data and strips out various information such as that identifying the start of a new line, the start of a new frame, and the raw luminance and chrominance data. The luminance and chrominance data is input to a demultiplexer 18 where it is separated into data portions corresponding to vertical blanking intervals of successive video frames (e.g., lines 1–21 of a counterpart NTSC analog television signal) and the active video portions of those frames. Demultiplexer 18 also determines if synchronization of the acquired data stream has been lost, and if so, outputs a "sync loss" signal to a video compression processor 22, which also receives the active video to be compressed. The video compression processor is a type well known in the art, such as described in U.S. Pat. Nos. 5,376,968; 5,235,419; 5,091,782; or 5,068,724.

It is noted that some types of user data which is classified as VBI data may not reside in the actual VBI. For example, programming lineup information used by the A. C. Nielsen Company for market research and referred to as "Automated Measurement of Lineup" (AMOL) is inserted into line 22 of field 2 of each television frame in the National Television Systems Committee (NTSC) broadcasting standard. Line 22 is an active video line, and thus a decoder may commence processing active video with line 23 instead of line 22 for NTSC signals Within a 30-frame sequence, the AMOL line for each frame will typically be present, but the data for most frames will generally be null. In order to accommodate AMOL data, the VBI is assumed to extend to line 22 instead of line 21.

The data contained in the VBI portions of the digital video input signal is output from demultiplexer 18 to random access memories (RAMs) 20, which include both a luminance RAM and a chrominance RAM. The RAMs store the data until required by a syntax processor 24 which extracts the VBI user information and builds a syntax enabling the information to be transported efficiently in the VBI portions of a digital television data stream to be communicated to a corresponding decoder, e.g., at an end user location.

The syntax provided by the syntax processor is stored in a header FIFO 28, which is used to assemble transport headers for, e.g., an MPEG or DigiCipher® II implementation of the digital television data stream. The header FIFO provides the syntax information to a barrel shifter 30 that combines the header with the compressed active video from a video coder 26. The video coder 26 codes the compressed video from the video compression processor 22 in a well known manner using, for example, Huffman coding to provide codewords (CW), codeword lengths (CL) and data tags which identify the coded information. The output from barrel shifter 30 is a data stream containing the active video separated by headers which contain information necessary to decode the active video. This data stream is stored in a video buffer 32 which provides the data on an as needed basis to a packetizer 34. The packetizer is a conventional component which assembles the data into transport packets in accordance with a transport stream standard such as the ATSC, MPEG-2 or DigiCipher® II digital television standard.

The functions of the syntax processor 24, insofar as they are relevant to the present invention, are described below using the formal grammar used by the ATSC and MPEG transport standards. This grammar is a C-language-like syntax and is a method of describing continuous and possibly variable rate sequences of bits, instead of specifying a procedural program and its functions as in the computer language C. The first column of the syntax contains the syntax element. The second column gives the length of the syntax elements in bits and the third column identifies the syntax type. The types are bslbf (bit string left-most bit first) and uimsbf (unsigned integer most significant bit first). The header "user_data ( ) {. . . }" indicates that the syntax elements within the braces are a named set and may be invoked elsewhere in the syntax by simply using the designation "user_data ( )". A conditional occurrence of bit structures may be indicated with the usual "if" tests. The customary relational operators well known in the C-language are also available. Loop structures are possible and use the standard C loop header syntax. The syntax table is accompanied by a set of semantics, providing definitions for each previously undefined syntax field and placing constraints on their use. The following picture user data bitstream syntax (in which the shaded areas represent the standard ATSC user data syntax and the non-shaded areas represent the syntax in accordance with the present invention) and bitstream semantics illustrate a preferred embodiment of the present invention:

| | No. of bits | Mnemonic |
|---|---|---|
| user_data( ) { | | |
| user_data_start_code | 32 | bslbf |
| ATSC_identifier | 32 | bslbf |
| user_data_type_code | 8 | uimsbf |
| if (user_data_type_code == '0 x 03') { | | |
| process_em_data_flag | 1 | bslbf |
| process_cc_data_flag | 1 | bslbf |
| additional_data_flag | 1 | bslbf |
| cc_count | 5 | uimsbf |
| em_data | 8 | bslbf |
| for (i = 0 ; I < cc_count ; i++) { | | |
| marker_bits | 5 | '1111 1' |
| cc_valid | 1 | bslbf |
| cc_type | 2 | bslbf |
| cc_data_1 | 8 | bslbf |
| cc_data_2 | 8 | bslbf |
| } | | |
| marker_bits | 8 | '1111 1111' |
| if (additional_data_flag) { | | |
| while( nextbits() != '0000 0000 0000 0000 0000 0001') { | | |
| additional_data_type | 8 | uimsbf |
| additional_data_length | 16 | uimsbf |
| if (additional_data_type == '0 x 01') { | | |
| luma_nrz_count | 5 | uimsbf |
| for (i = O; i<luma_nrz_count ; i++) { | | |
| luma_nrz_priority | 2 | uimsbf |
| field_number | 2 | uimsbf |
| line_offset | 5 | uimsbf |
| start_sample | 9 | uimsbf |
| nrz_increment | 6 | uimsbf |
| nrz_modulus | 9 | uimsbf |
| 0_amplitude | 8 | uimsbf |
| 1_amplitude | 8 | uimsbf |
| pulse_shape | 2 | uimsbf |
| if (pulse_shape == "rectangular") { | | |
| symbol_to_transition_ratio | 8 | uimsbf |
| } | | |
| if (pulse_shape == "raised_cosine") ( | | |
| reserved | 3 | bslbf |
| nrz_alpha | 5 | uimsbf |

| | | |
|---|---|---|
| } | | |
| if (pulse_shape == "rectangular") { | | |
| reserved | 8 | bslbf |
| } | | |
| word_count | 5 | uimsbf |
| for (j=0 ; j<word_count ; j++) { | | |
| marker_bit | 1 | bslbf |
| luma_nrz_word | 22 | bslbf |
| } | | |
| marker_bit | 1 | bslbf |
| remainder_count | 5 | uimsbf |
| for (j=0 ; j<remainder_count ; j++) { | | |
| luma_nrz_bit | 1 | bslbf |
| } | | |
| marker_bit | 1 | bslbf |
| } | | |
| } | | |
| additional_user_data | 8 | |
| } | | |
| } | | |
| } | | |
| next_start_code() | | |
| } | | |

Picture User Data Semantic Extensions additional_data_type—An 8-bit integer (values in the range [1:255]) indicating the type of additional data constructs following the field. This field shall have the value 01 in hexadecimal to indicate the additional data is luma NRZ data.

additional_data_length—A 16-bit unsigned integer (values in the range [0:65535]) indicating the length in bytes of additional data constructs following the field. The length does not include the additional_data_length field itself, but includes the following additional_data for the given additional_data type, up to but not including subsequent additional_data of any other additional_data_type.

luma_nrz_count—A five-bit integer (values in the range [0:31]) indicating the number of Luma NRZ constructs following the field. All such constructs must occur in the intended line and field display order.

luma_nrz_priority—A number between 0 and 3 indicating the priority of constructs in picture reconstruction where different levels of hardware capability exist. For Luma NRZ constructs, a fixed number of lines per display field can be labeled as priority zero.

field_number—The number of the field, in display order, from which the VBI data originated, interpreted in Table 2.

TABLE 2

Field Number for Picture User Data.

| Value | Meaning |
|---|---|
| 00 | Forbidden |
| 01 | 1st display field |
| 10 | 2nd display field |
| 11 | 3rd display field (the repeated field in film mode). | line_offset—A five-bit integer (values in the range [1:31]) giving the offset in lines from which the Luma NRZ data originated relative to the base VBI frame line (line 10 of 525-line {NTSC and PAL/M} field 1, line 273 of 525-line field 2, line 6 of 625-line {All PAL except PAL/M} field 1, and line 319 of 625-line field 2), as specified in CCIR Report 624-4.

start_sample—A 9-bit unsigned integer (values in the range [0:511]) which indicates the sample of the reconstructed luminance line at which the transition into the first luma NRZ symbol shall start. start_sample shall be in the same units as CCIR 601 samples and shall be relative to the first sample of CCIR 601 reconstructed frames.

nrz_increment—A 6-bit unsigned integer (values in the range [1:63]) which indicates the Luma NRZ symbol clock increment value and takes on values that describe, together with nrz_modulus, the relationship of the Luma NRZ symbol clock to a 27 MHz reference. See the semantics of nrz_modulus for more details.

nrz_modulus—A 10-bit unsigned integer (values in the range [2:1023]) which indicates the Luma NRZ symbol clock modulus value and takes on values that describe, together with nrz_increment, the relationship of the Luma NRZ symbol clock to a 27 MHz reference.

Specifically, nrz_increment and nrz_modulus are related to the Luma NRZ symbol rate as:

nrz_increment/nrz_modulus=Luma NRZ symbol rate/system_clock_frequency where
system_clock_frequency is specified in ISO/IEC 13818-1 as 27 MHz±30 ppm and the value of nrz_increment must not exceed nrz_modulus-1.

0_amplitude—An 8-bit unsigned integer (values in the range [1:254}) which indicates the amplitude at which luma NRZ symbols of value 0 shall be reconstructed in units of amplitude of CCIR 601 reconstructed frames.

1_amplitude—An 8-bit unsigned integer (values in the range [1:254}) which indicates the amplitude at which luma NRZ symbols of value 1 shall be reconstructed in units of amplitude of CCIR 601 reconstructed frames.

pulse_shape—A 2-bit unsigned integer which indicates the shape of the pulses which shall be used to reconstruct this line of Luma NRZ. The meaning of pulse_shape is defined in Table 3.

TABLE 3

Pulse Shape.

| pulse_shape | Luma NRZ Pulse Shape |
|---|---|
| 00 | rectangular |
| 01 | raised cosine |
| 10 | reserved |
| 11 | reserved | symbol_to_transition_ratio—An 8-bit unsigned integer (values in the range [16:255]) which indicates the ratio of each luma NRZ symbol's duration to each symbol's transition duration between the amplitudes specified by 0_amplitude and 1_amplitude and having units of $2^{-4}$ (0.0625). This field describes symbols with a symbol to transition ratio ranging from 1.0 to 15.9375.

nrz_alpha—A 5-bit unsigned integer (values in the range [0:31]) which indicates the value of Alpha for the Raised Cosine filter whose pulse shape describes each luma NRZ symbol with units of $2^{-5}$ (0.03125). This field describes values of Alpha from 0.03125 to 1.0. The meaning of nrz_alpha is defined in Table 4.

TABLE 4

NRZ Alpha.

| nrz_alpha | Alpha value |
|---|---|
| 00000 | 1.0 |
| 00001–11111 | nrz_alpha * 0.03125 | word_count—A 5-bit unsigned integer (values in the range [0:31]) which indicates the number of marker_bit and luma_nrz_word pairs that follow this field.

luma_nrz_word—A 22-bit string of luma NRZ symbols such that the first received bit is the value of the first luma NRZ symbol reconstructed on the video line as displayed from left to right. luma_nrz_words shall be received in the order that their symbols are to be reconstructed on the video line as displayed from left to right.

remainder_count—A 5-bit unsigned integer (values in the range [0:21]) which indicates the number of luma_nrz_bits that follow this field.

luma_nrz_bit—A single bit representing the luma NRZ symbol to be reconstructed on the video line. lum_nrz_bits shall be received in the order that their symbols are to be reconstructed on the video line, subsequent to symbols reconstructed from any luma_nrz_words, as displayed from left to right.

The above syntax is assembled by the syntax processor 24 illustrated in FIG. 1. In the preferred embodiment, the syntax processor is implemented in firmware. After the syntax is added to the digital video data, the resultant data stream is packetized and output from packetizer 34 to provide the final transport stream for communication to a population of decoders.

Figure 2:
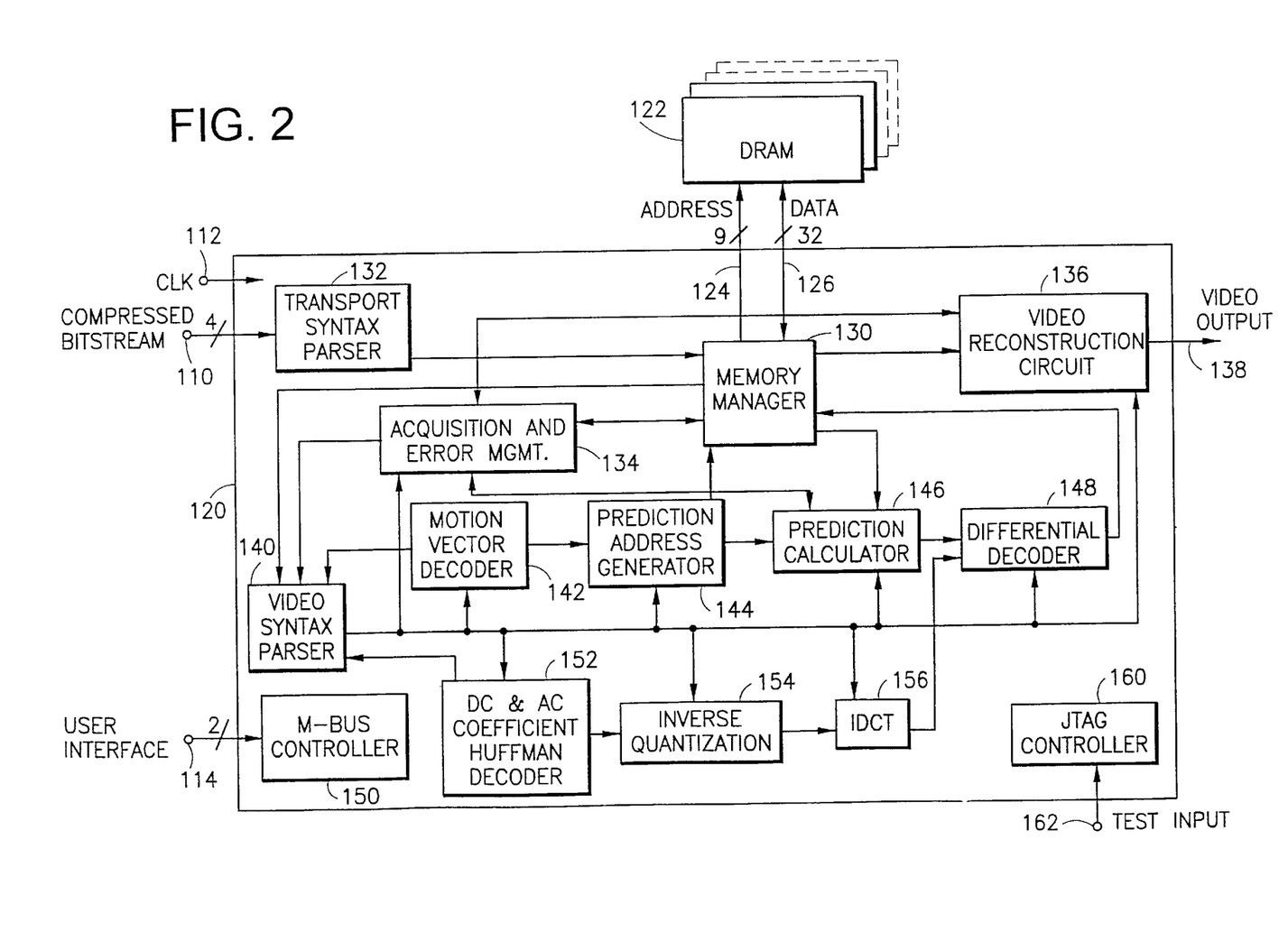
FIG. 2 is a block diagram of a video decompression processor incorporating the present invention.

FIG. 2 is a block diagram of a video decompression processor (i.e., decoder) for processing a received data stream that contains the VBI user data syntax detailed above. The video decompression processor (VDP) incorporates a memory manager 130 that addresses a DRAM 122 to store and retrieve video data necessary to reconstruct a television program at a receiver. The processor, generally designated 120, is a pipelined processor designed to decode both the transport layer (i.e., control and other non-video information) and the video layer of the compressed bit-stream input via terminal 110, sometimes referred to as the "transport packet interface" of the video processor.

A user processor interface which can comprise, for example, an M-bus controller 150 is provided at terminal 114 for control of the video data processor. This interface configures various registers in processor 120 as well known in the art.

An interface to the DRAM 122 is provided via address lines 124 and data lines 126. In the example illustrated in FIG. 2, DRAM 122 has a nine bit address port and a thirty-two bit data port.

A video output interface 138 is provided for the decompressed, reconstructed video which may, for example, be output as a standard CCIR 656, eight bit, twenty-seven MHz multiplexed luminance (Y) and chrominance (Cr, Cb) signal.

A test interface can be provided via terminal 162 to a conventional JTAG (Joint Test Action Group) controller 160. JTAG is a standardized boundary scan methodology used for board-level testing to detect faults in package and board connections, as well as internal circuitry.

The video decompression processor 120 receives a clock signal via terminal 112. The clock provides timing information that is used, e.g., to enable a transport syntax parser 132 to recover timing information and video information from transport packets contained in a packetized data stream input via terminal 110. An acquisition and error management circuit 134 utilizes a program clock reference (PCR) and decode time stamp (DTS) detected by a video syntax parser 140 to synchronize the start of picture decoding. This circuit sets vertical synchronization and provides global synchronization for all video decode and display functions.

The video layer is buffered in an input buffer (FIFO) configured in the DRAM 122 by memory manager 130. The video syntax parser 140 receives the compressed video data output from the DRAM FIFO via memory manager 130, and separates the motion vector information from the coefficients describing the video information. The coefficients are processed by a Huffman decoder 152, inverse quantizer 154, and inverse discrete cosine transform (IDCT) processor 156.

Motion vectors are recovered and used to address previously decoded video frames required for reconstructing a current video frame. In particular, a motion vector decoder 142 decodes the motion vectors received from video syntax parser 140 and passes them to a prediction address generator 144. The prediction address generator provides address information necessary to retrieve, via memory manager 130, the necessary anchor frame (i.e., intraframe (I) or prediction (P) frame) data to enable prediction calculator 146 to provide a prediction signal necessary to reconstruct a current frame block. Differential decoder 148 combines the prediction data with the decoded coefficient data to provide decompressed video data. The decompressed data is stored in appropriate buffers of DRAM 122 via memory manager 130. It should be appreciated that the video decompression processes carried out by motion vector decoder 142, prediction address generator 144, prediction calculator 146, differential decoder 148, Huffman decoder 152, inverse quantizer 154 and IDCT 156 are generally conventional and well understood by those skilled in the art.

Memory manager 130 schedules all activity on the DRAM address and data buses 124, 126 and efficiently addresses DRAM 122. The memory manager insures that the data transfer requirements of the input FIFO portion of DRAM 122, the video syntax parser 140 and the video reconstruction circuit 136 (as well as prediction calculator 146 and differential decoder 148) are all met. The video reconstruction circuit 136 calculates a current picture and processes the VBI user data in order to insert the desired user data for output on video output line 138. It should be appreciated that user data other than VBI user data may also be present, and that user data that is available may be stored temporarily before being processed and output. The video output 138 will contain the processed VBI user information together with the decompressed active video, in the original format presented to the serial receiver 12 illustrated in FIG. 1.

DRAM 122 is illustrated as an external memory. It should be appreciated that in future implementations, and as memory technology advances, DRAM 122 may be provided as internal memory within the video decompression processor. The DRAM is mapped to provide various decode and output video buffers as well as a circular FIFO buffer for the compressed input video bitstream. The DRAM may also be used to provide a test pattern buffer, a VITS buffer and a closed captioning display reordering buffer as well as to store various picture structure data necessary to properly display the decoded video frames. The DRAM can be reinitialized via memory manager 130 to provide different memory maps as required when variables are modified such as PAL or NTSC video, eight or sixteen Mbit memory configuration, and whether B-frames are present.

As indicated above, the memory manager 130 schedules all of the activity on the DRAM buses including the data transfer requirements of the input FIFO, the video parser and the video reconstruction circuit. The memory manager also performs the required DRAM refresh in a conventional manner. For example, the same row in each of two or four DRAMs can be refreshed simultaneously.

When a packetized bitstream containing compressed video data is input to terminal 110 of video decompression processor 120, video frames represented by the compressed data are reconstructed one at a time. Initially, a full frame of video data will have to be received and stored in DRAM 122. Information for subsequent video frames can comprise a subset of the full video frame which, when added to prediction data from the prior video frame (stored in DRAM 122) will result in the reconstruction of a full frame.

Figure 3:
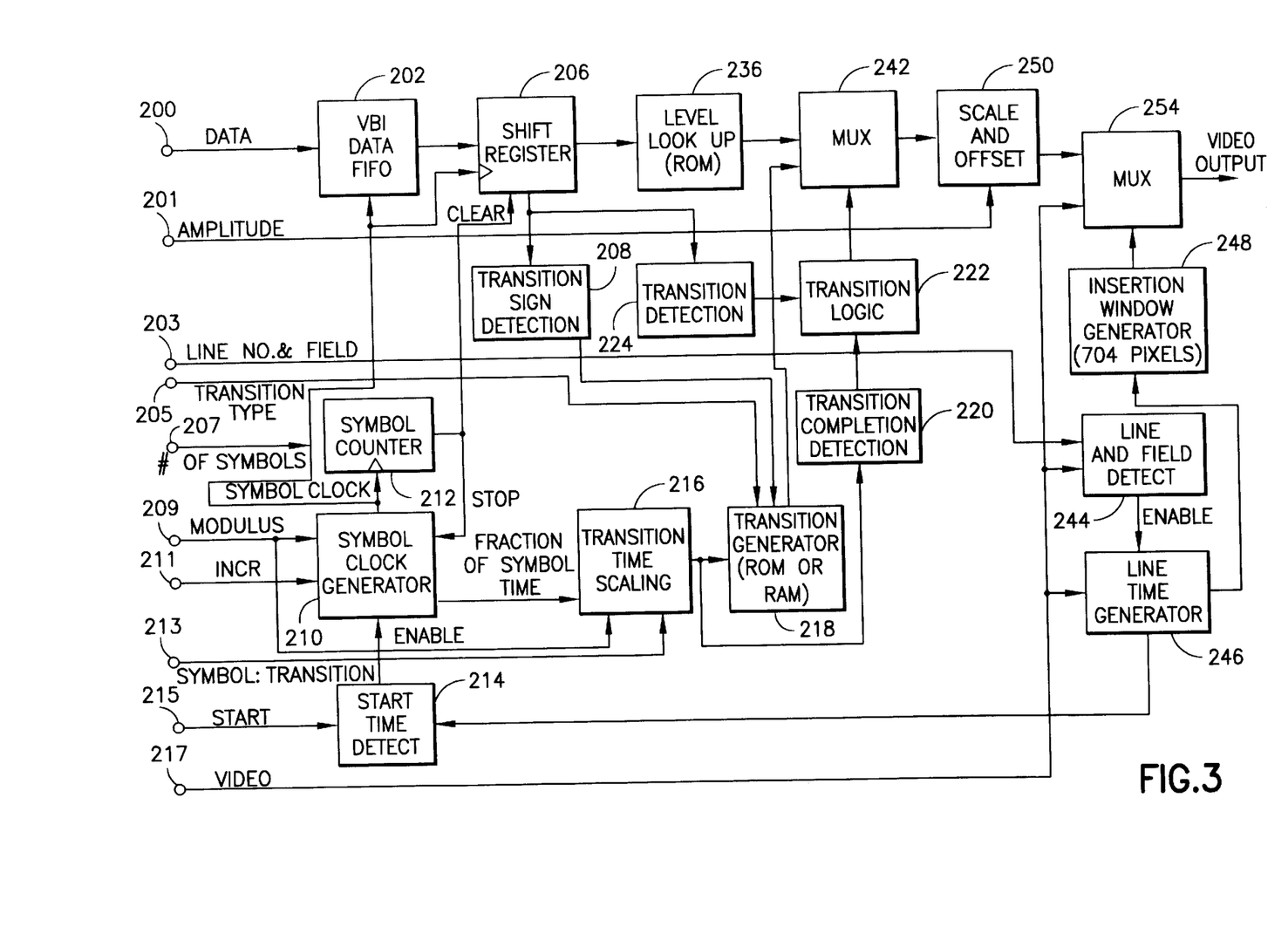
FIG. 3 is a block diagram of a first embodiment of a pixel generator for generating a digital VBI waveform from user data carried in a digital video data stream in accordance with the present invention.

FIG. 3 is a block diagram of a pixel generator for generating a digital VBI waveform from user data carried in a digital video data stream according to the syntax set forth above. The waveform generator may be part of the video reconstruction circuit 136 of FIG. 2, or may be provided independently of the video reconstruction circuit, e.g., for commercial applications where greater flexibility is desired albeit at potentially greater expense. The waveform generator is capable of accommodating the various parameters for the AMOL, VITC and EBU VBI standards set forth in Table 1. Each of these VBI services has a corresponding number of pixels per symbol. The closed caption, AMOL, VITC and EBU services have pulses with an impulse response time which is less than one symbol time, referred to herein as single symbol impulse response. The teletext services have a multisymbol impulse response, wherein the impulse response time is several symbols. A waveform generator for services having a multisymbol impulse response is described in FIG. 4.

The services with a single symbol impulse response each have a corresponding rise time, total transition time, and number of pixels per transition. This information is summarized for each service type in Table 5.

TABLE 5

VBI Service Characteristics

| Standard | Pixels/Symbol (Fraction) | Pixels/Symbol | 10%–90% Risetime | Total Transition | Pixels/Transition |
| --- | --- | --- | --- | --- | --- |
| Closed Captions | 429/16 | 26.81 | 240 nsec | 406.78 nsec | 5.4915 |
| AMOL I | 27/2 | 13.5 | 250 nsec | 423.73 nsec | 5.7204 |
| AMOL II | 27/4 | 6.75 | 125 nsec | 211.86 nsec. | 2.8601 |
| NABTS | 33/14 | 2.36 | N/A | N/A | N/A |
| WST (525) | 33/14 | 2.36 | N/A | N/A | N/A |
| WST (625) | 72/37 | 1.95 | N/A | N/A | N/A |
| VITC (525) | 264/35 | 7.54 | 200 nsec | 338.98 nsec | 4.5762 |
| VITC (625) | 216/29 | 7.45 | 200 nsec | 338.98 nsec | 4.5762 |
| EBU 3217 | 27/5 | 5.4 | 250 nsec | 423.73 nsec. | 5.7204 |

The single symbol impulse response category of service has the characteristic that there are four or more pixels at CCIR 601 sampling rate per symbol. As can be seen from Table 5, closed caption has the maximum number of pixels per symbol (e.g., approximately 27). For single symbol impulse response services, there is no overlap from one symbol to the next. The time response of the symbol is characterized by its transition and the full amplitude portion.

The transition portion of a symbol can be downloaded as part of the service, or resident in a transition memory (ROM or RAM), such as provided in transition generator 218 in FIG. 3. The use of ROM is more efficient in terms of hardware complexity and channel efficiency. A sine squared transition will work for all of the various VBI services.

Data to be inserted into a VBI waveform at a decoder is inserted via a symbol input 200 and queued in a FIFO 202.

The data is inserted into the VBI by playing back the symbols through a pixel generator. The pixel generator will be provided with the high and low levels to insert (0_amplitude and 1_amplitude) via terminal 201, the frame line number on which to insert the data (derived from field_number and line_offset) via terminal 203, the transition type (derived from pulse_shape) via terminal 205, the number of symbols to insert (derived from word_count and remainder_count) via terminal 207, the nrz_modulus and nrz_increment via terminals 209 and 211 respectively, the symbol_to_transition_ratio via terminal 213, and the start time of the first symbol (start_sample) via terminal 215. All of this information is specific to the particular type of VBI data to be inserted, and is provided via the syntax defined above. The video data into which the VBI data is to be inserted is input to the waveform generator via terminal 217.

The video data is provided, for example, in a conventional CCIR 656 format and is coupled to a multiplexer 254. The multiplexer also receives a gating signal from an insertion window generator 248, which enables the multiplexer to output VBI data during a time window that is, for example, 704 pixels in length.

In order to insert the VBI data into the video at the proper location, a line count of the video data is maintained and compared to the desired line of insertion. This function is provided by a line detector 244 and line time generator 246 which receives the current line information from the video data via terminal 217. The line time generator 246 is enabled by line detector 244 when the line into which VBI data is to be inserted is detected by the line detector. The line time generator then keeps track of the pixels for that video line, and provides the video line pixel count to insertion window generator 248 in order to provide the proper insertion window of, e.g., 704 active pixels.

Upon the arrival of a zero datum of the correct line, the line time generator 246 also signals a start time detector (counter) 214 which commences a down count for the start pixel time dictated by the start_sample information obtained from the syntax. The start pixel down counter 214 enables a symbol clock generator 210 which, in turn, clears a symbol counter 212.

The symbol clock generator 210 receives the nrz_modulus and nrz_increment from the syntax. Once the symbol clock generator is started in response to detector 214, the symbol time is derived by incrementing a counter by the numerator of the fraction symbol time over pixel time. The modulus of the counter is the denominator of the fraction. If desired, the numerator and denominator may be multiplied by a constant to simplify the hardware implementation.

The symbol clock generator 210 outputs a symbol clock to the FIFO enable for clocking the VBI data out from the FIFO 202. It also provides the fraction of symbol time that a current sample represents to a transition time scaling circuit 216, described below. The symbol clock runs until the symbol counter 212 counts the number of symbols specified by the word_count and remainder_count from the syntax, at which time a stop signal is generated. The stop signal also clears the shift register 206 in the VBI data path.

The VBI data shifted through register 206 is monitored by a transition sign detection circuit 208. The presence or absence of a transition is detected by comparing the previous transmitted symbol with the current symbol to be transmitted. If they are the same, the same value is generated and transmitted. If there is a difference between the two symbols, then transition generator 218, which may comprise, for example, read only memory (ROM) or random access memory (RAM) is selected.

The transition generator 218 stores data for generating multiple transition functions, one for each transition type that is supported, for the VBI data pulses for the different VBI standards. The particular transition function selected for the current VBI data is determined by the transition type specified by the pulse_shape value of the syntax and input to the transition generator 218 via terminal 205. For example, the transition function may provide the pulse_shape as a rectangular or raised cosine pulse.

The beginning and end of the transition are dictated by the addresses input to the transition generator from the transition time scaling circuit 216, which scales the fraction of symbol time in accordance with the symbol to transition duration ratio from terminal 213 and the nrz_modulus from terminal 209. The scaled fraction of the symbol time represents the position of the sample in time within the rise time of the VBI data pulse. The transition process is repeated until detection circuit 220 determines that the address exceeds the range of the transition generator ROM or RAM, at which time the symbol has reached 100 percent of its final value. An output multiplexer (selector) 242 then selects the final value for the current and remainder of that symbol's pixels. Selection logic 222 controls the multiplexer 242 based on the initial detection of a transition by transition detection circuit 224 and the completion of the transition as determined by circuit 220.

A look up table (LUT) 236 (stored, e.g., in ROM) converts each bit of data output from shift register 206 into an eight-bit level that is ultimately scaled to the proper luminance level for the particular type of user data being processed. For example, LUT 236 can convert a binary "0" into the eight-bit word 00001111 and a binary "1" into the eight-bit word 1110000. This mapping is arbitrary, and any other desired eight-bit levels can be chosen for the binary "1" and "0". The eight-bit level from the output of LUT 236 is provided to multiplexer 242 which selects this level for output unless a transition is in progress as indicated by select logic 222, in which case the transition function from transition generator 218 is output.

The data stream output from multiplexer 242 is then scaled to the required output levels in response to the 0_amplitude and 1_amplitude values delivered by the user data syntax via terminal 201. An output multiplexer 254 inserts the resultant VBI data on the video stream from terminal 217, for the insertion window provided by generator 248. The insertion window corresponds to the active video duration.

Multiple VBI services can be inserted with the generator of FIG. 3. Additional circuitry is necessary to load the variables required to run the generator on a line-by-line basis. The data is queued in a common FIFO. In the implementation shown, all clocks are running at 13.5 MHz, unless otherwise indicated. This is one-half the rate of the standard MPEG, ATSC and DigiCipher II system clock.

Data complying with EBU 3217 has the property that the transition time is slightly longer than the symbol time. This can be overcome by selecting a transition function that has a slower ten percent to ninety percent time relative to the entire transition. The specified filter for wave shaping EBU 3217 data is Gaussian transitional. A windowed Gaussian transition may provide better performance than sine squared.

Teletext services can be supported in a similar manner as disclosed for the VBI services discussed in connection with FIG. 3. To support teletext, the waveform generator must handle an impulse response which, as noted above, is greater in duration than one symbol. An example implementation of such a VBI waveform generator is illustrated in FIG. 4.

Figure 4:
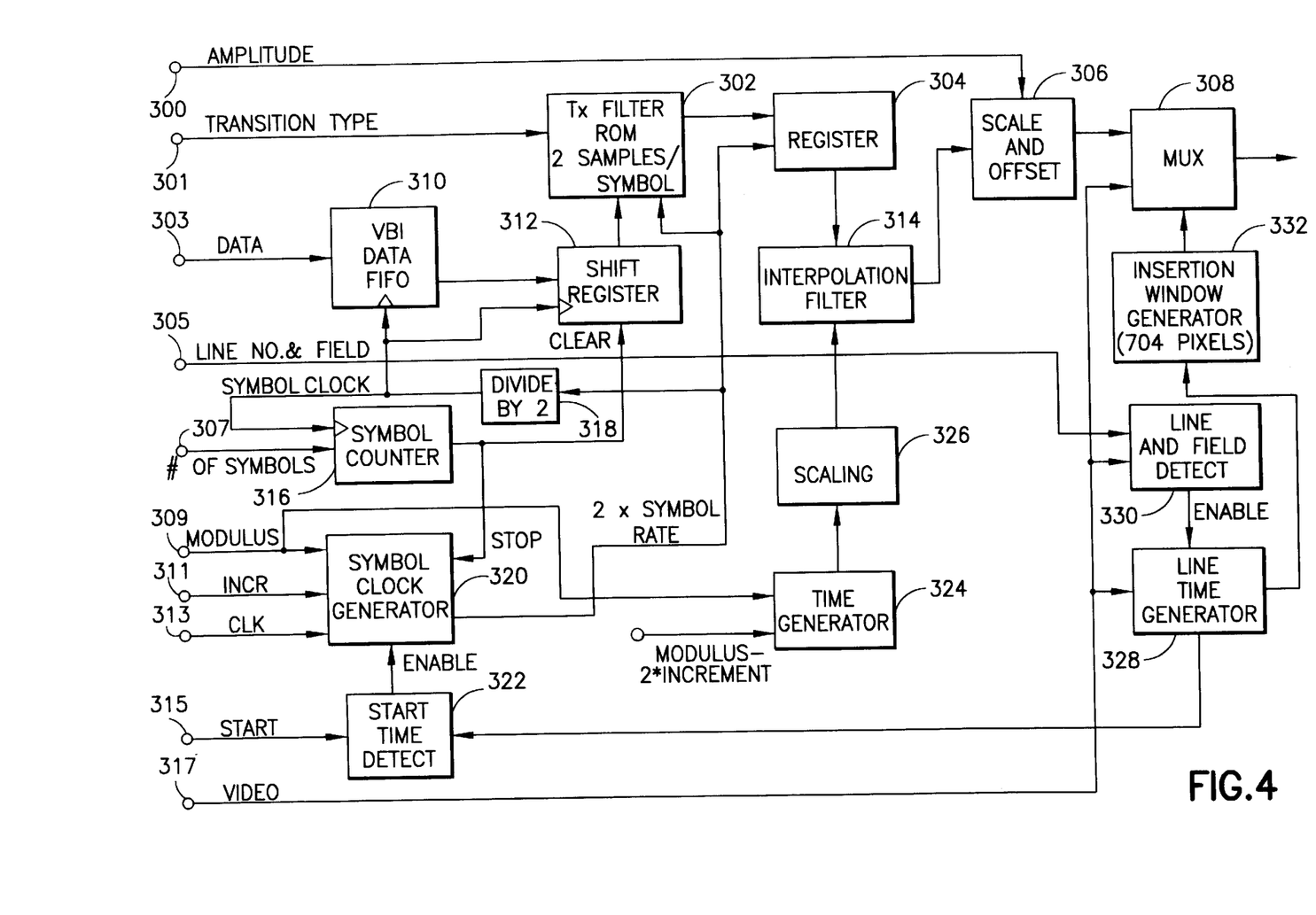
FIG. 4 is a block diagram of a second embodiment of a pixel generator for generating a digital VBI waveform from user data carried in a digital video data stream when the impulse response time of the VBI transmission standard is greater than one symbol time.

The VBI Data FIFO 310, shift register 312, symbol counter 316, symbol clock generator 320, start time detect circuit 322, scale and offset circuit 306, multiplexer (selector) 308, insertion window generator 332, line detect circuit 330 and line time generator 328 of FIG. 4 are equivalent to the similarly named elements in FIG. 3. In order to handle multisymbol impulse responses of the teletext services, which can range from 1.89 to 2.36 samples per symbol at 13.5 MHz sampling, a transmit (Tx) filter ROM 302 and interpolation filter 314 are provided. It should be appreciated that the filter 302 can also be implemented in RAM if desired, particularly if the impulse response of the desired format is to be downloaded instead of being stored locally in ROM. Any such download will be at a fixed number of samples per symbol rate. The syntax for such a download can be provided according to the C-language-like syntax discussed previously. The interpolator is used to generate the 13.5 MHz rate pixels. The rate difference is the increment of the interpolator.

The data to be inserted is queued in FIFO 310 via terminal 303. The data is inserted into the VBI by playing back the symbols through the pixel generator. The pixel generator is provided with the start time of the first symbol pixel via terminal 315, the number of pixels per symbol (increment/modulus) via terminals 311 and 309, the high and low levels (0_amplitude and 1_amplitude) to insert via terminal 300, the impulse response of the signaling system (transition type) via terminal 301, the number of symbols to insert via terminal 307, and the field and line number on which to insert the data via terminal 305.

The video data input to terminal 317 is provided in CCIR 656 format. The line count is derived and compared to the desired line of insertion in circuits 330, 328 and 322. Upon the arrival of the correct line's zero datum, a down count for the start pixel time is started in circuit 322, which enables the symbol rate clock generator 320 at the appropriate time. The 704 pixel window generator 332 is enabled by the line time generator 328.

As in the waveform generator of FIG. 3, symbol time is derived by incrementing a counter by the numerator of the fraction "symbol time/pixel time", where the increment "INCR" is the numerator and the modulus of the counter is the denominator of the fraction. In addition to receiving the modulus and increment via terminals 309 and 311, respectively, the symbol clock generator 320 receives the system clock (e.g., 27 MHz) via terminal 313. By running the symbol clock generator at, e.g., 27 MHz rather than 13.5 MHz, a twice symbol rate clock is generated.

The enable input of FIFO 310 receives the symbol clock from a divider 318, which divides the output of clock generator 320 by two. This is necessary because the symbol clock generator provides a clock at twice the symbol rate. Once the specified number of symbols has been output from the FIFO, the symbol clock is disabled for the current television line. All subsequent data symbols are forced to the low (zero) state. These symbols are not data, but rather fill the balance of the 704 pixel window with low state data.

The transmit filter ROM 302 generates two samples per symbol. The transmit shift register 312 is loaded with transmit symbols at the symbol rate, when start time has arrived. The register is initialized to a low state on completion of each insertion. The transmit data for the duration of the impulse response is applied to the transmit ROM from shift register 312. The ROM stores a look up table of impulse responses computed in advance in accordance with well known techniques. By storing the results of the FIR calculation in the ROM, it is not necessary to store the FIR coefficients to calculate the results. The appropriate FIR for the particular transition to be provided in the VBI waveform is output from the LUT when the ROM is addressed by the transition type via terminal 301.

Figure 5:
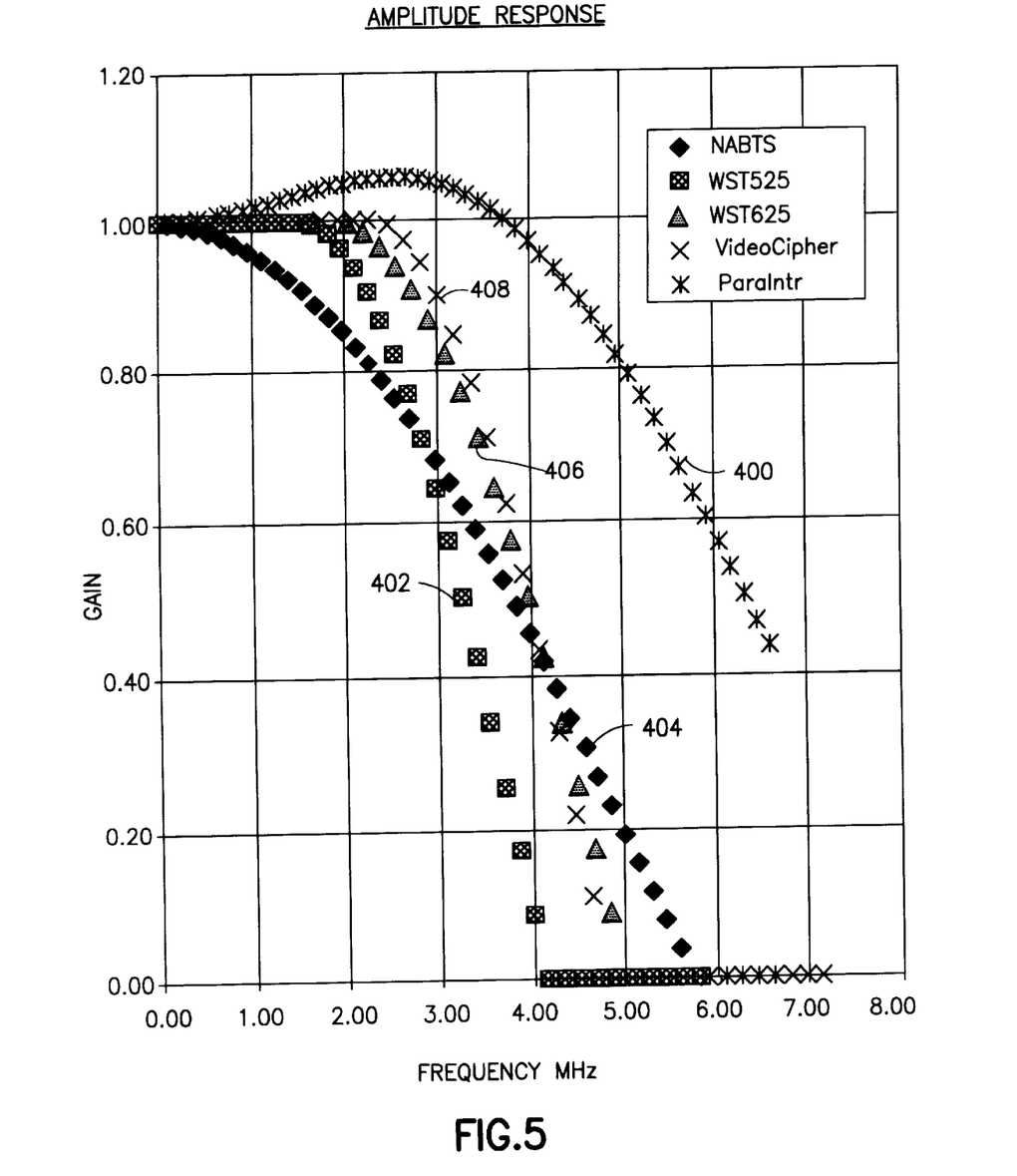
FIG. 5 is a graph illustrating the frequency response of the interpolator of FIG. 4.

The output of the transmit filter is provided to an interpolating filter 314 via register 304. The interpolation filter converts the 2 sample per symbol rate data to 13.5 MHz samples. An example of an appropriate interpolation filter is described by the following FIR coefficients:

$A_0 = \alpha\mu^2 - \alpha\mu$ $A_1 = -\alpha\mu^2 + (\alpha+1)\mu$ $A_2 = -\alpha\mu^2 + (\alpha-1)\mu + 1$ $A_3 = \alpha\mu^2 - \alpha\mu$ where $\alpha$ is defined to be 0.5. $\mu$ is the time for the sample to be interpolated. The frequency response 400 of this interpolator (ParaIntr) and the transmit impulse responses 402, 404, 406 and 408 for the various teletext standards, as well as for the VideoCipher standard proprietary to the original assignee of the present invention, are illustrated in FIG. 5. It can be seen that the interpolator clearly influences the transmitted frequency response. This frequency response error can be corrected (predistorted) in the transmit filter 302 to minimize its impact. It is a requirement that the transmit spectrum, and its images be well controlled prior to interpolation. This is the case for the described data signal types. If the pixel rate per symbol is less than about 3 samples per symbol, a greater number of samples per symbol would be required.

The data supplied to the interpolator 314 is at twice symbol rate. The actual transfers of data occur coincident with the 27 MHz tick. The interpolator output is read at 13.5 MHz. The time interpolation variable is supplied to the filter at the 13.5 MHz rate. A time generator 324 and scaling circuit 326 allow the numerical representation of $\mu$ to be consistent with the numerical system of the filter hardware, and independent of the current modulus value.

The data stream has to be scaled to the required output levels. This can be accomplished, for example, with one multiply and addition per pixel provided by the scale and offset circuit 306. The output multiplexer 308 inserts the VBI data from the scale and offset circuit 306 on the CCIR video stream from terminal 317, for the 704 pixel window.

There are various alternate ways to implement the functions provided by the waveform generator circuits of FIG. 3 and FIG. 4, and the specific embodiments illustrated are by no means meant to be limiting. For example, the scaling and offset can be done earlier in the process than illustrated. In the embodiment of FIG. 4, any of a variety of known interpolators can be used. Moreover, in the multisymbol embodiment, lower data rates can be supported by having impulse responses with more samples per symbol. All of the current teletext standards are supported by two samples per symbol.

Additionally, M-level (multilevel) pulse amplitude modulation (PAM), with M≧2, can be supported using the waveform generator of FIG. 4. In such implementations, with M>2, there would be log base 2 of M bits per symbol supplied to the transmit filter ROM. With M=2, there is one bit per symbol supplied to the transmit filter ROM.

It should now be appreciated that the present invention provides a method and apparatus for communicating user information in a digital television data stream. The user information is a type that is conventionally carried as NRZ data in the vertical blanking interval of an analog television signal. The user data is transported in a user data syntax, which has been supplemented with various fields. These include an additional data type field, a luma NRZ count and priority, field number, line offset, start sample, NRZ increment and modulus, amplitude values, pulse shape information, and word and remainder count information relating to the user data which is carried in the form of luma words and luma NRZ bits.

Although the invention has been described in connection with a preferred embodiment, it should be appreciated that various adaptations and modifications may be made thereto without departing from the spirit and scope of the invention as set forth in the claims.

What is claimed is:

1. An apparatus for generating a digital waveform according to a user data syntax of a vertical blanking interval (VBI) service for insertion into VBI portions of a digital video signal, said apparatus comprising:

a symbol processor for receiving VBI data from said VBI service and providing said VBI data in a format which is compatible with said VBI service according to said user data syntax;

said syntax providing a start time for a first symbol of a plurality of symbols which carry said VBI data and indicating (i) a number of pixels represented per symbol, (ii) a transition time for said symbols, and (iii) the number of symbols carrying said VBI data; and a timing circuit for effecting the insertion of said VBI data into a VBI portion of a television line identified by said syntax according to said start time.

2. The apparatus of claim 1, further comprising:

a buffer coupled to said symbol processor for temporarily storing said VBI data.

3. The apparatus of claim 1, further comprising:

a level control circuit for adjusting the level of said VBI data prior to insertion into said VBI portion in response to at least one amplitude value provided by said syntax.

4. The apparatus of claim 3, wherein:

said level control circuit provides M-level amplitude modulation of said VBI data, with M>2.

5. The apparatus of claim 1, wherein:

said level control circuit provides non-return-to-zero amplitude modulation of said VBI data.

6. The apparatus of claim 1, wherein:

said VBI data of said VBI service has a single symbol impulse response;

said symbol processor comprises a transition processor for detecting a transition in said VBI data and generating a transition waveform in response to the detected transition which is compatible with said VBI service; and said apparatus further comprises means for combining said transition waveform with the VBI data to provide said digital waveform for insertion into said VBI portion of the television line identified by said syntax.

7. The apparatus of claim 6, wherein said transition processor further comprises:

means for generating a transition function for said VBI service according to a transition type thereof defined by said syntax;

said transition waveform being generated according to said transition function.

8. The apparatus of claim 7, wherein said transition processor further comprises:

a memory for storing transition data for generating said transition function;

said means for generating being responsive to said stored data for generating said transition function.

9. The apparatus of claim 1, wherein said VBI data has a multisymbol impulse response, said symbol processor comprising:

means for implementing an impulse response function to generate a data symbol sequence representing the VBI data for said VBI service.

10. The apparatus of claim 9, further comprising:

a memory for storing impulse response data for said VBI service according to a transition type thereof defined by said syntax;

said means for implementing being responsive to said stored impulse response data for implementing said impulse response function for said VBI service.

11. The apparatus of claim 10, wherein:

said impulse response data is downloaded to said memory for storing impulse response data.

12. A method for generating a digital waveform according to a user data syntax of a vertical blanking interval (VBI) service for insertion into VBI portions of a digital video signal, said method comprising the steps of:

receiving VBI data from said VBI service;

providing said VBI data in a format which is compatible with said VEI service according to said user data syntax;

said syntax providing a start time for a first symbol of a plurality of symbols which carry said VBI data and indicating (i) a number of pixels represented per symbol, (ii) a transition time for said symbols, and (iii) the number of symbols carrying said VBI data; and inserting said VBI data into a VBI portion of a television line identified by said syntax according to said start time.

13. The method of claim 12, comprising the further step of:

buffering said VBI data prior to said providing step.

14. The method of claim 12, comprising the further step of:

adjusting the level of said VBI data prior to insertion into said VBI portion in response to at least one amplitude value provided by said syntax.

15. The method of claim 14, wherein:

said level control circuit provides M-level amplitude modulation of said VBI data, with M>2.

16. The method of claim 12, wherein:

said level control circuit provides non-return-to-zero amplitude modulation of said VBI data.

17. The method of claim 12, wherein said VBI data of said VBI service has a single symbol impulse response, said method comprising the further steps of:

detecting a transition in said VBI data and generating a transition waveform in response to the detected transition which is compatible with said VBI service; and combining said transition waveform with the VBI data to provide said digital waveform for insertion into said VBI portion of the television line identified by said syntax.

18. The method of claim 17, comprising the further step of:

generating a transition function for said VBI service according to a transition type thereof defined by said syntax;

said transition waveform being generated according to said transition function.

19. The method of claim 18, comprising the further step of:

storing transition data for generating said transition function;

said generating step being responsive to said stored data for generating said transition function.

20. The method of claim 12, wherein said VBI data has a multisymbol impulse response, comprising the further step of:

implementing an impulse response function to generate a data symbol sequence representing the VBI data for said VBI service.

21. The method of claim 20, comprising the further step of:

storing impulse response data for said VBI service according to a transition type thereof defined by said syntax;

said implementing step being responsive to said stored impulse response data for implementing said impulse response function for said VBI service.

22. The method of claim 21, comprising the further step of:

downloading said impulse response data;

wherein said storing step is responsive to said downloading step.

* * * * *